Sept. 21, 1954
W. A. AYRES
2,689,502
METHOD OF MAKING STEREOSCOPIC PICTURES
Filed Feb. 16, 1949
5 Sheets-Sheet 1
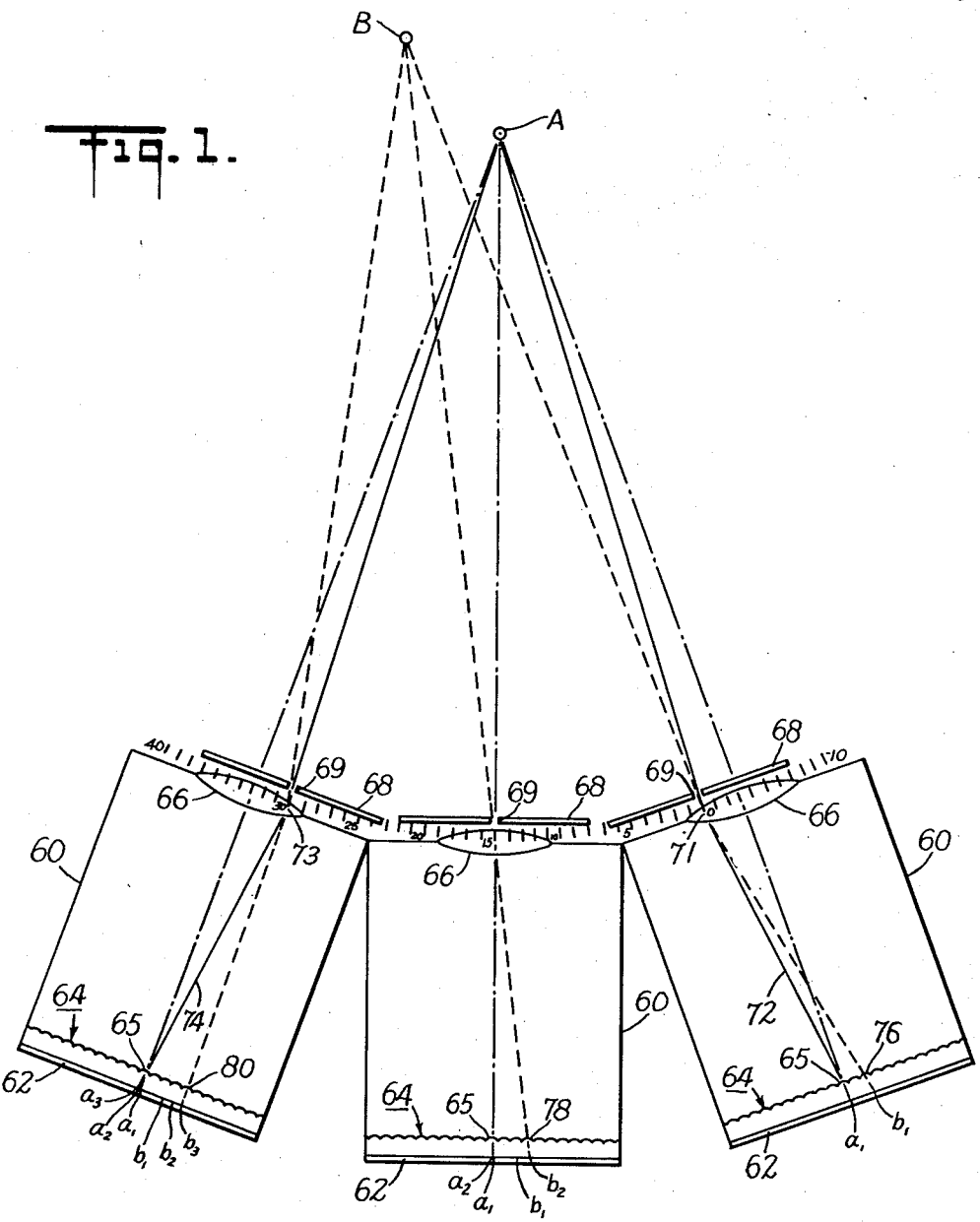
INVENTOR
Waldemar A. Ayres
BY
Curtis, Morris + Safford
ATTORNEYS Sept. 21, 1954      W. A. AYRES      2,689,502
METHOD OF MAKING STEREOSCOPIC PICTURES
Filed Feb. 16, 1949      5 Sheets-Sheet 2
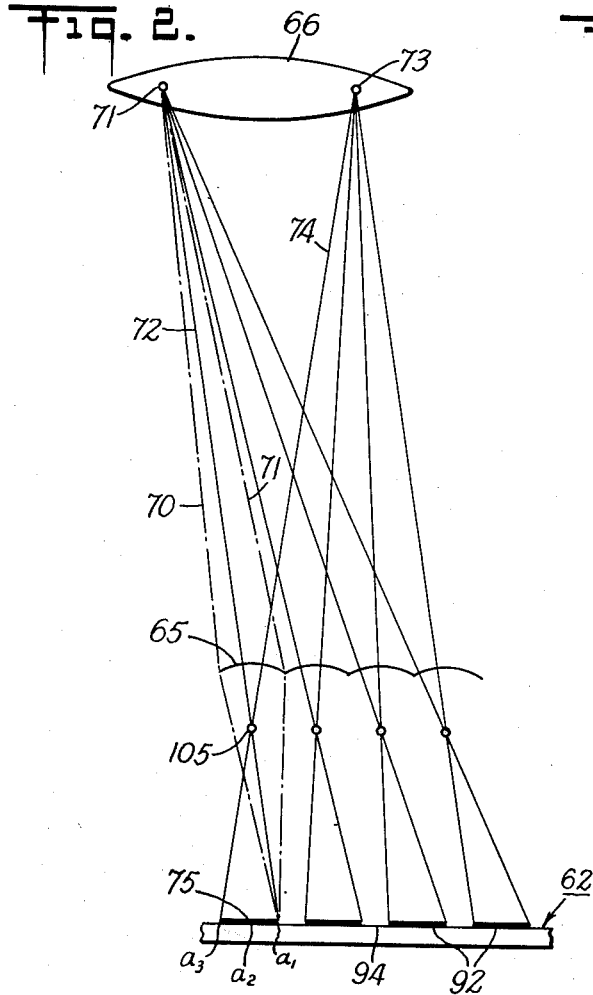
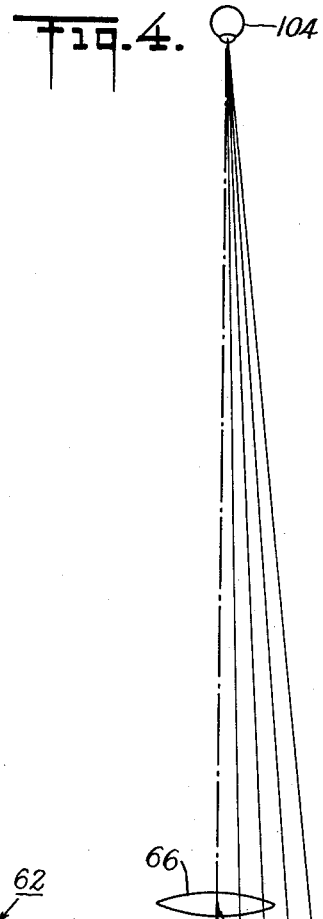
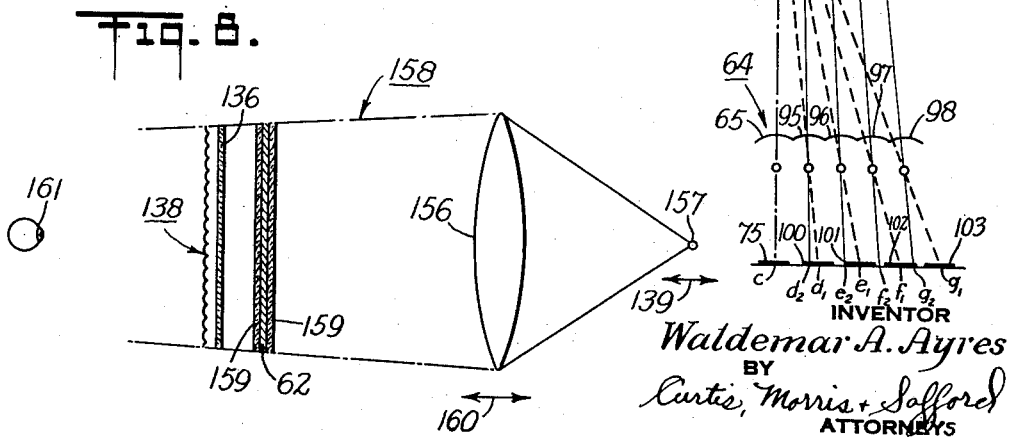
INVENTOR
Waldemar A. Ayres
BY
Curtis, Morris + Safford
ATTORNEYS

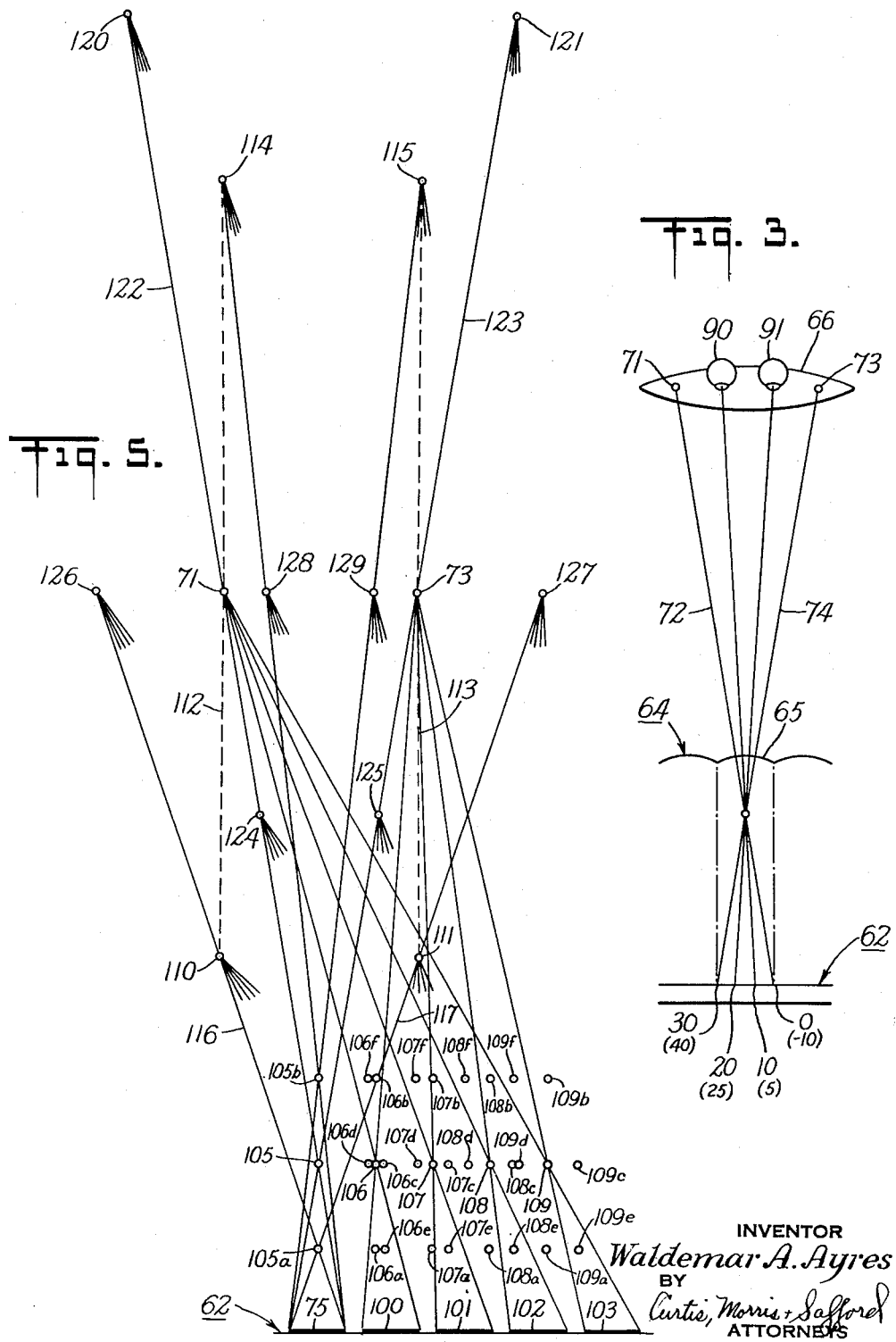

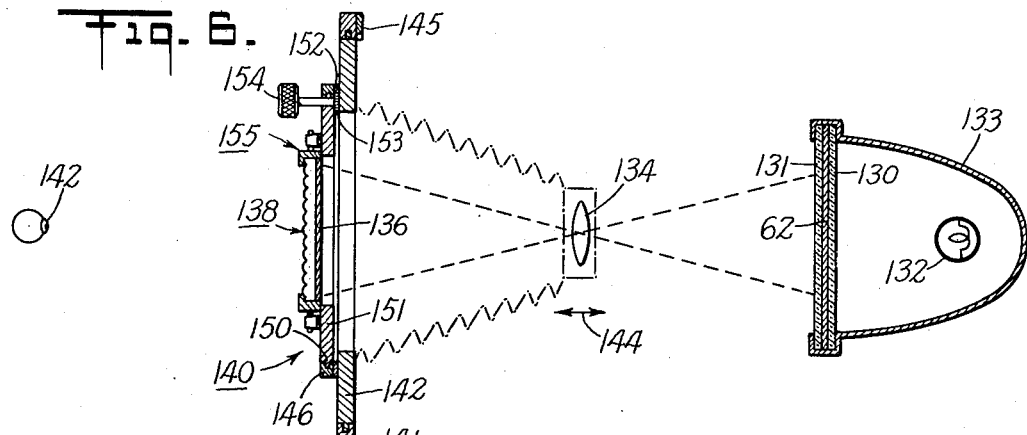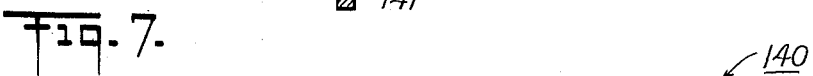

Sept. 21, 1954. W. A. AYRES 2,689,502
METHOD OF MAKING STEREOSCOPIC PICTURES
Filed Feb. 16, 1949 5 Sheets-Sheet 5

INVENTOR
Waldemar A. Ayres
BY
Curtis, Morris + Safford
ATTORNEYS

Patented Sept. 21, 1954

2,689,502

UNITED STATES PATENT OFFICE 2,689,502

METHOD OF MAKING STEREOSCOPIC PICTURES

Waldemar A. Ayres, Kew Gardens, N. Y.

Application February 16, 1949, Serial No. 76,783

8 Claims. (Cl. 88—24)

1

This invention relates to stereoscopic photography, and more particularly to methods of and means for achieving improved stereoscopic pictures, for altering such pictures to adapt them for various viewing conditions, and for enabling the taking of such pictures with diverse types of cameras, including those which are already commercially available and in widespread use.

The invention is concerned with that type of stereoscopic photograph known as the "parallax panoramagram"—i. e., one wherein the successive views of different portions of the subject as viewed from a range of positions are recorded in different parallel strip areas on a photosensitive film, for example by exposure through a lenticulated or a "black-line" screen, and the resulting photograph is mounted for viewing through a similar screen so that the two eyes of the observer see the subject as viewed from two different positions, with resulting illusion of depth.

It is among the objects of this invention to provide a method for adapting such stereoscopic pictures for viewing under a wide range of conditions, for example with various permissible viewing angles.

Another object is that of providing a method of varying the "depth treatment"—i. e., the apparent depth—of such pictures.

An additional object is the provision of a mounted picture wherein the subject is reproduced with good fidelity and with desired depth illusion, despite inequality of the distance from which the mounted photograph is normally viewed and the focusing distance of the lens through which the subject was photographed, and despite random dimensional changes in the film or in the screen.

Another object is that of providing a mounted picture wherein the lateral position of the lenticulations of the screen is in optimum relation to the exposed areas of the film, for the desired viewing conditions.

It is also an object to provide a system of stereoscopic photography well adapted to employ short focal length cameras, such as the portable amateur cameras now available.

A further object is the provision of practical means for efficient achievement of the aforesaid objects. These, and other objects which will be apparent hereinafter, are accomplished by the present invention, suitable embodiments of which are described hereinafter and illustrated in the accompanying drawings, in which, Figure 1 is a diagrammatic illustration of one of the methods of stereoscopic photography to which the present invention relates;

Figure 2 is a distorted enlargement of a portion of the showing of Figure 1;

Figure 3 is a diagrammatic illustration of a stereoscopic photograph produced in accordance with such method, showing certain relations in the taking and viewing thereof;

2

Figure 9:
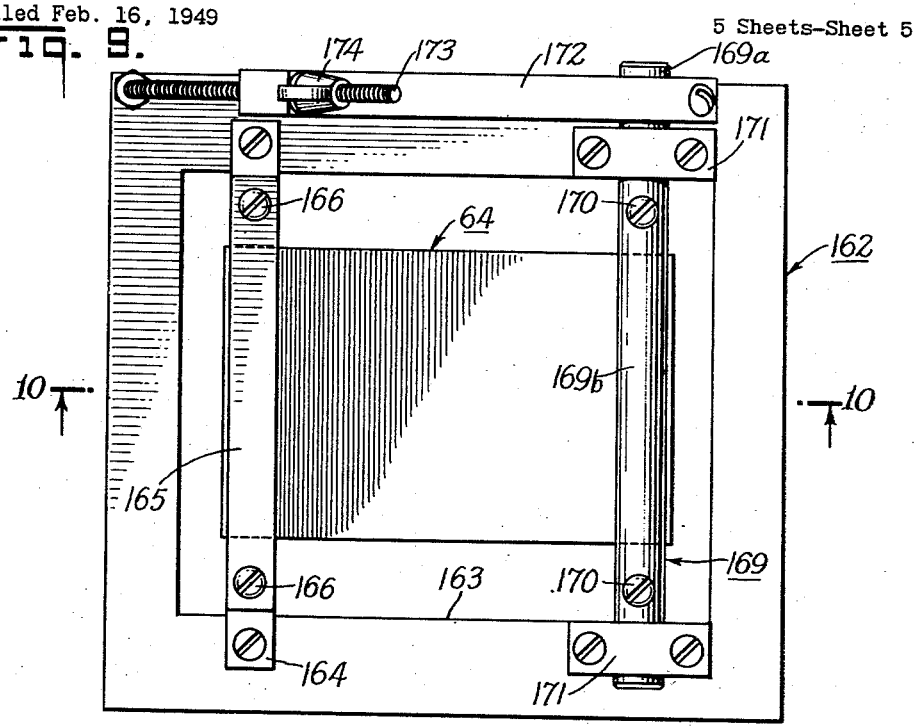
Figure 10:
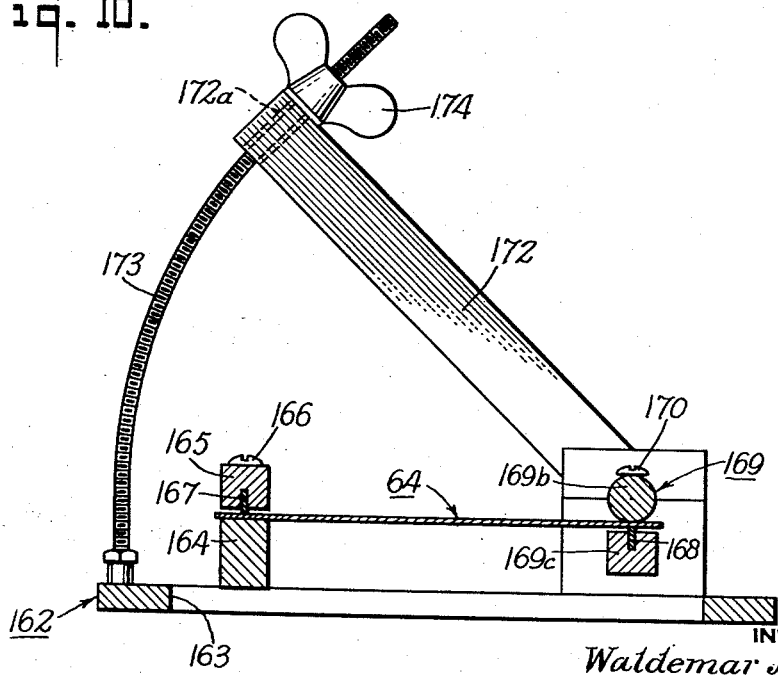

Figure 4 is a diagrammatic illustration of a defect formerly inherent in this system of stereoscopic photography;

Figure 5 is a diagrammatic illustration of several types of modification contemplated by the present invention;

Figure 6 is a partially diagrammatic illustration of one of the specific methods of correction within the scope of the present invention, and of the apparatus employed in such method;

Figure 7 is an enlarged view of a portion of the apparatus shown in Figure 6, taken at right angles to the view of Figure 6;

Figure 8 is a diagrammatic illustration of another method of correction contemplated by the invention;

Figure 9 is a plan view of one embodiment of an apparatus used for accomplishing a different type of correction; and Figure 10 is a vertical section taken along line 10—10 of Figure 9.

In certain of the figures, particularly Figures 1 through 5, portions of the figures are disproportionately magnified, for purposes of clarity.

In Figure 1, a camera 60 is shown photographing a scene in which the illuminated points A and B appear. In the particular photographic method illustrated, camera 60 is moved in an arc from right to left while making a continuous photographic record of the scene throughout the viewing angle. Camera 60 is loaded with a conventional photosensitive element such as a film 62, which may be either roll or cut film, or sensitized glass plate, as well understood in the art. In front of this film 62 is mounted a transparent screen 64 having vertically oriented lenticulations, such as 65, formed in its front surface. The screen 64 may suitably be formed of transparent plastic material, such as cellulose acetate or Vinylite, and may suitably have a maximum thickness of the order of .070″, with 64 lenticulations to the lateral inch. The lenticulations are suitably of cylindrical shape and their optical characteristics—i. e., their curvature, and the index of refraction of the material of which they are formed—should preferably be such that each focuses substantially at the photosensitive surface of film 62 to form there a smaller image of the portion of the composite image falling upon it. With the photosensitive surface adjacent the rear surface of the screen, as shown, the focusing distance of the lenticulation is accordingly equal to the thickness of the screen.

For simplicity the lens 66 of the camera is illustrated as a simple double-convex lens. It will, of course, be understood that any of a number of conventional compound lens arrangement may suitably be used. Immediately ahead of lens 66 is positioned a mask 68 having narrow vertical slit 69. Mask 68 is arranged to be moved laterally when camera 60 is moved, so that when camera 60 is in the extreme right-hand position shown in Figure 1, slit 69 is opposite a point 71 near the left-hand extremity of lens 66. When camera 60 has completed one half of its lateral movement, as shown in the central position of Figure 1, mask 68 has moved so that slit 69 is opposite the center of lens 66, and when the camera 60 has completed its lateral movement and has reached the left-hand position shown in Figure 1, the mask 68 has moved to place slit 69 opposite a point 73 near the right-hand extremity of lens 66.

Due to the action of lens 66, at any position of slit 69 there will be formed upon screen 64 a complete image of the scene photographed, as viewed from that position of the slit. However, due to the action of the lenticulations of screen 64, the portion of the composite image falling upon each lenticulation will be focused in a very narrow vertical line on the film 62 behind such lenticulation.

For illustration, the center of curvature of the arcuate movement of the camera has been chosen to coincide with point A. With camera 60 in its extreme right-hand position, as shown in Figure 1, and with slit 69 in its extreme left-hand position relative to lens 66, light emanating from point A and passing through slit 69 will be focused upon the central lenticulation 65 of screen 64. As shown at enlarged scale in Figure 2, lenticulation 65 functions to focus the rays of light arriving at the lenticulation from slit 69—i. e., the rays in the wedge-shaped path bounded by lines 70 and 71—along a vertical line whose position is indicated by point $a_1$ on film 62. Since the ray of light whose path is indicated by the line 72 through the center of curvature 105 of lenticulation 65, enters lenticulation 65 normally to its surface and accordingly is not subjected to refraction, the position of point $a_1$ may be determined by projection of line 72. If the image is perfectly focused, the vertical image centering about point $a_1$ will, of course, have a finite width proportional to the width of slit 69, in a ratio equal to the ratio of the focusing distance of lenticulation 65 to the distance from lenticulation 65 to lens 66; it is not essential, however, that this focus be perfect provided only that the light in said wedge-shaped path 70—72 is confined on film 62 to a very narrow line. For convenience in illustration hereinafter, the light falling upon each lenticulation at any position of the slit will be represented as a single ray and the resulting image on the film as a single point.

Each of the lenticulations functions to cause the incident light rays to "pivot" about the center of curvature of the lenticulation. When slit 69 is at its extreme left-hand position relative to lens 66, as shown in the portion of Figure 2 just described, its image, at point $a_1$, appears at the extreme right of the portion of film 62 opposite lenticulation 65. When camera 60 has moved to the central position shown in Figure 1, at which time slit 69 is opposite the center of lens 66, light emanating from point A passes through the center of lens 66 without refraction, enters the center of lenticulation 65 and is brought to focus by lenticulation 65 at point $a_2$, in the center of the portion of film 62 opposite lenticulation 65. And when camera 60 has completed its lateral movement to the left-hand position shown in Figure 1, at which time slit 69 is in its extreme right-hand position relative to lens 66, light emanating from point A falls upon lenticulation 65 in a direction indicated by the line 74 (Figure 2), and is brought to focus by lenticulation 65 at point $a_3$ on film 62. It will thus be seen that the movement of slit 69 relative to lens 66 has caused the image of point A on film 62 to sweep out an area 75 on film 62 bounded by the points $a_1$ and $a_3$.

The effect of movement of camera 60 upon the image of point B, which is eccentric with respect to such movement, is somewhat different. When camera 60 is in the extreme right-hand position shown in Figure 1, and slit 69 is in its extreme left-hand position relative to lens 66, the image of point B falls, as shown, upon the lenticulation 76 spaced some distance to the right of the lenticulation 65 upon which the image of point A is formed. As previously explained, with slit 69 in this position the image $b_1$ formed by lenticulation 76 will be at the extreme right of the center of the record area of film 62 associated with this lenticulation.

When camera 60 has moved to the central position shown in Figure 1, the angle between points A and B subtended at the camera position is greater than that between points A and B when camera 60 was in the right-hand position just described; it follows that the spacing between the images of points A and B on screen 62 will now be greater. It has already been shown that image of point A falls upon the same lenticulation 65 in all positions of camera 60. Accordingly, the image of point B now will fall upon a lenticulation 78, to the right of the lenticulation 82. Since the slit 69 is now opposite the center of lens 66 the point $b_2$ will be at the center of the record area of film 62 associated with the lenticulation 78.

When camera 60 is moved to the extreme left-hand position shown in Figure 1, the image of point B now falls upon a lenticulation 80 yet farther to the right, and, since slit 69 has now moved to its extreme right-hand position, the point $b_3$ at which the image of point B is formed on film 62 will be at the extreme left of the record area associated with lenticulation 80.

When the exposed film is developed, printed and mounted, and is viewed from a point corresponding to point 71, the images of the points A and B appear behind lenticulations 65 and 76 respectively. When viewed from a point corresponding to the center of lens 66, the image of point A, as described above, will remain apparently fixed in position behind lenticulation 65, but the image of point B will now be seen through lenticulation 78. And when viewed from a point corresponding to point 73, the image of point B will appear through lenticulation 80. Accordingly, as the point of view is changed through the angle between points 71 and 73 the image of point A remains stationary, and the image of point B moves across the picture, in perfect simulation of the relative movement of objects at different depths in the actual field of view. When an observer uses both eyes to view the mounted picture, the two eyes being positioned at any two different points within the limits of points 71 and 73, the two eyes will see different views, in which the relative positions of the images of points A and B are different, in exact similitude of the difference between the views of the two eyes when the actual scene is viewed binocularly. Thus, the mounted photograph presents an effective illusion of depth.

As the slit 69 moves from left to right relatively to lens 66, the images behind each of the lenticulations of screen 24 move from right to left in similar fashion as that behind lenticulation 25 (see Figure 2). Thus, behind each of the lenticulations of screen 64 there is exposed a lateral area 92 on film 62. As shown in Figure 2, these record areas 92 may be of such width that they do not completely occupy the entire available surface of film 62, leaving unexposed areas 94 between adjacent record areas 92. This depends upon such values as the effective aperture width, focusing distances of the camera lens and of the lenticulations, and the lateral spacing of the lenticulations. Ideally, but not necessarily, these values should be so chosen that the total available surface of film 62 is exactly consumed by the record areas 92, without any unexposed areas 94, and without any overlapping of the record areas, which would result in double exposure in the region of the overlapping.

If it be assumed, for example, that within the range of movement of camera 60, 30 separate views of the subject are taken, as indicated by the numbered positions 0 and 30 in Figure 1, the successive images of point A as viewed from these 30 positions will be recorded on the record area behind lenticulation 65; these images will be laid down from right to left on film 62 as indicated by the points numbered 0 and 30 in Figure 3.

When film 62 is processed to form a positive photograph, and when this photograph is mounted with a similar lenticulated screen 64, and is viewed by a pair of eyes 90 and 91 (Figure 3), these eyes will see through lenticulations 65 views of point A which are recorded at points 10 and 20 on film 62. The views of points 10 and 20 are those taken at the similarly numbered points on Figure 1. In other words, the eyes 90 and 91 will see on film 62 the same views of the subject matter they would see if positioned at points 10 and 20 of Figure 1.

Assume now that the lateral scan of camera 60 is increased to include the successive views of the subject matter between points −10 and 40 in Figure 1. Assume further that the movement of lens 66 and aperture 69 relative to screen 64 remains fixed at such angle that the entire record area of film 62 opposite lenticulation 65 is swept, the images corresponding to the wider range of view are recorded in the same area of film 62, as indicated by the parenthetical numerals −10 and 40 (Figure 3) at the right- and left-hand extremities of the record area of the film 62 opposite lenticulation 65. The eyes 90 and 91 will, of course, still see through lenticulation 65 the same two points on film 62, at which now are recorded the images of the subject matter from points 5 and 25 respectively, as parenthetically indicated. That is, the eyes will see the same views they would see at positions 5 and 25 on Figure 1. The result of increasing the lateral movement of the camera has been to increase the effective interocular distance, thereby increasing the "depth treatment."

For proper effect, the observer's head should be positioned so that his eyes are within the lateral range of points 71 and 73 (see Figure 3); otherwise, one of the eyes will see through lenticulation 65 the images at points within respectively different record areas than will be seen by the other eye, an effect referred to herein as "phase shift." If the points 71 and 73 are spaced at a greater distance than the interocular distance, as shown in Figure 3, some latitude in positioning of the observer's head will be permitted. This has heretofore necessitated either the use of a lens of relatively great diameter, or the lateral movement of the lens together with the slit relative to the lenticulated screen, e. g., as disclosed in my copending application, Serial No. 76,784, now Patent No. 2,644,382, issued July 7, 1953. The latter alternative entails some modification of conventional cameras. The present invention effectively overcomes this limitation by providing a method of changing the permissible lateral viewing range of a stereoscopic picture of the type described to adapt it for any of a wide range of desired viewing conditions. For example, a photograph taken with a relatively short lateral movement of the slit 69 relative to the screen 64 and film 62 may be adapted for viewing through a much wider range without distortion or phase shift. This allows the use of cameras having lenses of relatively small diameter without movement of the lens.

From the foregoing discussion of depth treatment, it will be understood that any change in the lateral range of permissible viewing positions will result in a change in the depth effect. If, as in the above example, the viewing range is increased, a greater change of the viewing position is required to give the effect of a given extent of change in camera position, with resulting decrease in depth treatment.

Thus far in the discussion it has been assumed that the mounted picture is viewed from a distance equal to the focusing distance of the lens 66 through which the photograph was taken. Figure 4 illustrates the error heretofore occasioned by viewing the mounted picture at a different—in this case, greater—distance. For purposes of illustration, the center of the lens 66 is indicated as the point of origin of the image formed upon the screen 64. The portion of the image which falls upon the center lenticulation 65 is brought to focus at the point $c$ in the center of the record area 75 associated with lenticulation 65. Similarly, the portions of the image falling upon the lenticulations 95, 96, 97 and 98 to the right of the center lenticulation 65 are brought to focus at points $d_1$, $e_1$ and $f_1$ and $g_1$ respectively, at the median positions of the record areas 100, 101, 102 and 103 associated with such lenticulations. Accordingly, when the mounted photograph is viewed from a position corresponding to the center of lens 66, the images of the points $c$, $d_1$, $e_1$, $f_1$, and $g_1$ will be visible through the adjacent lenticulations to form a composite image or view corresponding to the scene photographed.

When, however, the eye 104 is moved to a different position, for example farther away from the mounted picture to the position shown in Figure 4, a different and distorted composite view will be seen. The image at point $c$ will still be visible through lenticulation 65. However, the image seen through the lenticulation 95 adjacent to the lenticulation 65 will not be that at the point $d_1$, but at the point $d_2$ at some distance to the left of point $d_1$ within the record area 100. Through the lenticulation 96 will be seen the point $e_2$ at the extreme left edge of the record area 101. Through the lenticulation 97 will be seen the unexposed area 94 to the left of the record area 102 associated with lenticulation 97, and through the lenticulation 98 will be seen the image of point $g_2$ in the record area originally associated with the lenticulation 97. In other words, there is a phase shift. This results in an apparent lateral discontinuity in the picture. The error is frequently carried to such extent that a multiple phase shift takes place—i. e., the images visible through some lenticulations are of points in record areas removed two or more record-area widths from the record area originally associated therewith.

Due to the disproportionate magnification in this figure, the showing of each lenticulation covers an area which in actuality would contain many lenticulations. Each of these lenticulations shown thus effectively represents the many lenticulations which would occupy the area in the same relative position on the screen, and the relations shown in each lenticulation represent the average relations in the lenticulations within such area. If the picture comprises a positive photographic print, the unexposed areas 94 between the areas of different phase on the mounted picture will appear as dark vertical areas, which are referred to as phase shift lines.

It will be seen that, prior to the present invention, substantial equality of viewing distance to focusing distance was necessary for proper fidelity of reproduction. This requirement has constituted a serious limitation of the utility and scope of stereoscopic photography of the type described. Since the average comfortable viewing distance is of the order of 14″, it has been necessary to use cameras with lenses having focusing distances of that order. This has ruled out small portable cameras of the types widely owned by amateurs, and has effectively limited the art to large and unwieldly studio cameras.

The present invention contemplates the alteration of the relation between certain optical characteristics of the screen through which the photograph is exposed and the size of the photographic record thereby made, in such manner as to adapt the stereoscopic picture to a desired set of viewing conditions, for example, a certain optimum viewing distance, viewing angle, depth treatment, etc.

Figure 5 illustrates several of the types of modification within the scope of the invention. In that figure, there is diagrammatically shown the right-hand half of the film 62 with a viewing screen mounted in front of it; as is well known in the art, the screen may either be lenticulated, or be a "black-line" screen—i. e., a mask with vertical slits or other apertures. Neither type of optical elements is illustrated, but instead only their centers 105, 106, 107, 108 and 109 are shown. In the lenticulated screen, these would represent the centers of curvature of the lenticulations, and in the "black line" screen the centers of the vertical slits. Although the following discussion will be directed specifically to lenticulated screens, it applies equally to screens of the blackline type.

The points 71 and 73, representing the extremities of movement of the slit 69 relative to the lens 66 during exposure of the film 62, are also indicated. As previously described, this movement of the slit from point 71 to point 73 results in exposure of the record areas 75, 100, 101, 102 and 103 on film 62.

When the film 62 is developed and there is formed therefrom a positive photograph, either an opaque print or transparency, of the same size as the original photographic record, which photograph is mounted with a screen of identical characteristics as the screen used for the taking of the photograph, the conditions discussed hereinabove will obtain. That is, for proper results, the resulting picture must be viewed from the plane of points 71 and 73, and within the lateral range of such points. Under such conditions, the depth treatment of the picture will be dependent upon the extent of lateral movement of the camera during the taking of the picture, as described above.

One of the changes contemplated by the present invention is the substitution for a screen of such characteristics (i. e., identical with the screen through which the photograph was taken) of another screen whose lenticulations are of shorter focal length, in other words, a thinner screen. The result of this substitution is effectively to shift the centers of curvature of the lenticulations of the viewing screen from the points 105, 106, 107, 108 and 109 closer to the photograph, e. g., to the points 105a, 106a, 107a, 108a and 109a respectively.

With this shorter focal length viewing screen, the lines from the right-hand extremities of each of the record areas through the centers of curvature of their respective lenticulations as represented in Figure 5, all converge at point 110. To avoid confusion of the drawing, only one full line is shown, with only the portions of the other lines adjacent point 110 being shown. The lines drawn from the left-hand extremities of each of the record areas through the centers of curvature of their respective lenticulations converge at point 111 at some distance to the right of point 110. When the observer's eye is positioned at point 110, he will simultaneously see through the lenticulations of the viewing screen the right-hand extremities of the record areas associated therewith; if the viewing position is moved to point 111, the observer will see the left-hand extremities of the record areas. Accordingly, within the lateral range between the points at which the lines of view to the extremities of the record areas converge, i. e., 110 and 111 in the case described, the observer will see an undistorted picture. The plane of these convergence points 110 and 111 (the "viewing plane"), due to the increase in the "viewing angle" (the angle subtended at the picture by lines 116 and 117 through the points 110 and 111, which define the lateral limits of proper viewing), without an increase in the "lateral range of viewing" (the spacing of points 110 and 111) as compared to the lateral range for photographing, i. e., the spacing of points 71 and 73 (as indicated by parallel dotted lines 112 and 113). The effect of using a thinner screen is thus seen to be to increase the viewing angle without changing the lateral range of permissible viewing positions. These effects combine to decrease the optimum viewing distance.

Another type of change contemplated by the invention is the use of a screen having lenticulations of greater focal length than the screen through which the photograph was exposed. This effectively moves the centers of curvature of the lenticulations farther from the photograph, e. g., to the relative positions 105b, 106b, 107b, 108b and 109b respectively. The lines drawn from the left- and right-hand extremities of the record areas through their respective centers of curvature now converge at points 114 and 115 at some distance beyond the photographing plane 71—73. The points 114 and 115, which represent the extremities of the range of permissible viewing position are at the same spacing as are points 71 and 73, as indicated by parallel dotted lines 112 and 113.

It will accordingly be seen that changes in thickness of the viewing screen result in changes in the viewing angle while the viewing range remains unchanged. The optimum viewing distance is also changed, because of the interdependence of the three value of viewing distance, viewing range and viewing angle. Whenever the viewing range is changed, the depth treatment is also changed, as hereinabove explained.

Another type of change contemplated is the use of a viewing screen having lenticulations of different width than the lenticulations of the photographing screen. The points 106c, 107c, 108c and 109c represent the relative position of the centers of curvature of a viewing screen having lenticulations of greater lateral spacing (i. e., greater width). The center of curvature 105 of the center lenticulation is shown as remaining effectively fixed in position. The lines from the right and left extremities of the record areas through the new centers of curvature of their respective lenticulations now converge at points 120 and 121 respectively at some distance beyond the photographing plane. The effect of this change is thus to increase the lateral viewing range, without change in the viewing angle, as illustrated by the lines 122 and 123 from points 120 and 121 to the center of curvature 105, which pass also through the points 71 and 73 respectively. There has, of course, resulted an increase in the viewing distance.

If a screen having narrower lenticulations than the original screen is employed, the centers of curvature are effectively moved laterally, e. g., to the points 106d, 107d, 108d and 109d respectively, with center 105 remaining in position. The lines from the extremities of the record areas through the centers of curvature of their respective lenticulations now converge at points 124 and 125. The viewing points 124 and 125 are more closely spaced than points 71 and 73, but subtend the same angle with respect to the picture, as shown by the lines 122 and 123. The effect of using this screen of narrower lenticulations has thus been to shorten the lateral viewing range without changing the viewing angle, with resulting decrease in the viewing distance.

It is, of course, possible to use a screen whose lenticulations are different both with respect to width and with respect to focal length from those of the photographing screen. The effect is a composite of the individual effects of the two changes. It is also possible to change these two values in such manner as to keep other desired values constant; for example, assume that it is desired to maintain the viewing distance equal to the focusing distance, but to increase the viewing angle. This may be accomplished by using a screen having lenticulations which are both wider and of shorter focal length than those of the photographing screen. This effectively moves the centers of curvature of the lenticulations to the positions 105a, 106e, 107e, 108e and 109e. The lines from the extremities of the record areas through these points now converge at points 126 and 127 in the same plane as points 71 and 73 but at greater spacing and at greater angle with respect to the picture.

The use of a screen having lenticulations of lesser width and greater focal length than the lenticulations of the original screen produces an opposite effect. The centers of curvature are now at points 105b, 106f, 107f, 108f and 109f, and the lines from the extremities of the respective record areas through these points now converge at points 128 and 129 in the same plane as points 71 and 73 but at closer spacing and at lesser angle with respect to the picture.

In all of the types of modification discussed hereinabove, it is not the absolute change in dimensions of the screen nor of the photographic record, but the change of ratio between these dimensions that accomplishes the desired modification. If the photographic record, for example, in undergoing various changes of form such as printing of a positive from a negative, also is changed in size, and the various dimensions of the screen associated with the record are changed proportionately, the viewing characteristics of the screen will be changed only to the extent that the viewing distance and lateral range of viewing will be increased in this same ratio, while the viewing angle will remain substantially unchanged.

It will, of course, be understood that any effect obtainable by changing the width of the lenticulations of the screen may be obtained instead by changing the size of the photographic record.

From the foregoing discussion, it will be appreciated that by altering the relations between the optical characteristics of the screen and the size of the photographic record area that the picture may be adapted for viewing under any of a wide range of viewing conditions.

The desired modification of these relations may be accomplished by any of a number of methods. Figure 6 illustrates one method of and apparatus for accomplishing a change in size of the photographic record, for example, to compensate for an inequality of the viewing distance to the focusing distance of the lens through which the photographic record was originally made. This is known as the projection printing method, and involves the enlargement or diminution of the photographic record by projection. After the film 62 has been exposed and developed to place it in the form of a negative or transparency, it is placed between a sheet of frosted or "flashed opal" glass 130 and a sheet of clear glass 131. A source of light, such as an electric bulb 132 and reflector 133, is directed toward the film through the frosted glass 130, to give uniform illumination thereto. A lens 134 is used to focus the image of the record on film 62 upon a sheet of ground glass 136 mounted adjacent a lenticulated or black-line screen 138 identical to the screen with which the finished picture will be mounted, with the frosted side of the glass 136 toward screen 138. The glass 136 and the screen 138 are mounted in a frame indicated generally at 140, which allows their movement of both rotationally and translationally, to achieve proper orientation and centering of the screen 138 with respect to the record areas of the image formed on the ground surface of glass 136. With the operator viewing from point 142, the desired viewing distance from the lenticular screen, the lens 134 is moved longitudinally as indicated by the arrow 144, until phase lines and other evidences of phase shift and distortion disappear from the picture. Under such conditions, the dimensions of the image appearing on the ground surface of glass 136 will be proper for viewing through a screen identical with screen 138 from the normal viewing distance, regardless of the dimensions of the record area of the film 62—in other words regardless of the focal length of the lens through which original photographic record was made, and regardless of any random dimensional changes in the film. Ground glass 136 and screen 138 are then removed and replaced by a sheet of photographic film, with the emulsion side of the film in precisely the same relative plane previously occupied by the ground side of glass 136, and the film is exposed for the required time. The resulting film is developed and a positive picture—either an opaque print or a transparency—is made and is mounted with a lenticulated screen identical with screen 138 and in the same relative position as was screen 138 at the completion of the projection operation just described.

Figure 7 is another view of the frame 140 shown in Figure 8. This comprises an open rectangular frame 141 within which a second rectangular frame or slide 142 is mounted for vertical sliding movement. The vertical position of slide 142 is controlled by means of a pinion 143 coupled to a knob 144 on frame 142 and meshing with a rack 145 on one of the upright portions of frame 141. A rectangular slide 146 is supported within vertical slide 142 for lateral movement to a position controlled by a rack 147 on frame 142 meshing with a pinion 148 coupled to a knob 149 on slide 146. Slide 146 has a circular opening 150 in which is rotatably mounted a circular holder 151 whose rotational position is determined by an internally toothed ring gear 152 on slide 146 meshing with a pinion 153 coupled to a knob 154 on holder 151. Holder 151 has a rectangular opening with a spring clamping means 155 (see also Figure 7) therearound for supporting the ground glass 136 and screen 138 during the projection printing operation, and adapted to allow removal and replacement thereof by a sheet of film for exposure of the latter. The knobs 144, 149, and 154 respectively control the vertical, lateral and rotational movements of ground glass 136 and lenticulated screen 138 to achieve proper orientation and centering thereof relative to the image formed on the ground surface of glass 136.

Figure 8 illustrates an alternative method of projection printing by which the same type modification may be achieved. A condensing lens 156 acts upon the light rays emanating from a point source of light 157 located near the focal point of lens 156, to create a slightly converging beam of light 158. The negative film 62 bearing the original photographic record is placed in this beam, and supported by means of two sheets of transparent glass 159. A sheet of ground glass 136 is mounted with its ground surface next to a lenticulated or black-line screen 138, in like manner as described in connection with Figure 6, a slight distance from film 62 on the side opposite the lens 156 and light source 157. Suitably the ground glass and lenticulated screen are mounted on a frame 140 of the type just described, and are rotated and moved translationally to achieve proper orientation and centering of the image on the ground surface of glass 104. Then, either lens 156 or light source 157 is moved axially, as indicated by the arrows 160 and 139, respectively, to change the convergence of rays 158 until the image, as viewed from point 161, at the desired viewing distance from the screen 138 is free from distortion and phase shift; the ground glass is then replaced with a film which is exposed, printed and mounted as before.

In Figures 9 and 10 is shown an apparatus for stretching a lenticulated screen to increase the lateral spacing of the lenticulations thereof, for example to increase the lateral range of viewing and the optimum viewing distance. This mechanism comprises a rectangular frame, generally indicated at 162, having a central rectangular opening 163. A bar 164 extends transversely of frame 162, and supports a second bar 165 directly thereabove by means of a pair of locking screws 166 extending through bar 165 into bar 164. A grip member 167, for example, a serrated blade such as a section of a hacksaw blade, is supported in a recess in the lower side of bar 165, and protrudes slightly therefrom to engage one end of the lenticular screen 64 to be stretched, holding this end of screen 64 in fixed position relative to frame 162.

The opposite end of screen 64 is engaged by a grip member 168 in a bar 169c, likewise extending transversely of the frame 162. Grip member 168 cooperates with a cylindrical rod 169b, the pressure applied between grip member 168 and rod 169b being adjusted by locking screws 170. Bar 169b is supported in trunnions 171 on opposite sides of frame 162. One end 169a of rod 169b projects beyond the adjacent trunnion 171 and is engaged by one end of a radial arm or lever 172. The opposite end of lever 172 is traversed by a generally vertical opening 172a through which is freely received an arcuate threaded rod 173, the lower end of which is secured to frame 162. It may be seen that movement of lever 172 in a counter-clockwise direction as viewed in Figure 10, about the pivot 169d of rod 169b will result in a movement of the right-hand end of screen 64 toward the right. Since the opposite end of screen 64 is held in fixed relative position, this movement of lever 172 results in a stretching of screen 64. Pressure is applied to lever 172 to effect this stretching by means of a wing nut 174 threaded upon rod 173 and bearing against the upper side of lever 172. It will be appreciated that the mechanical advantage achievable by virtue of the screw action of wing nut 174 and rod 173 and of the leverage of lever 172 is such that little effort is required in turning wing nut 166 to apply the necessary force for accomplishing stretching of the screen.

The opening 163 in frame 162 allows the device to be placed above a light box, with the negative or transparency which is to be stretched in proper position beneath the screen, so that the stretching may be carried to such extent as to provide a picture of proper appearance when observed from the desired viewing distance.

When the screen has been stretched it may be set in its stretched position, for example by heating to an extent sufficient to plasticize the material of the screen to slight degree. Alternatively, the plasticization may be accomplished by placing the screen in an atmosphere of solvent vapor. Another method of preventing return to original size of the stretched screen after removal from the stretching frame is to bond the screen to a thick sheet of transparent material, either glass or plastic, while the screen is still on the stretching frame. In such case, the overall thickness of the screen and the supporting sheet advantageously may be equal to the focusing distance of the lenticulations. Thicknesses of .010" for the unbonded screen, and of 0.060" for the supporting sheet have been found suitable.

Once a screen of proportions suitable to accomplish a desired modification has been prepared, additional screens of identical proportion for use in connection with the same type camera may be made without repeating the stretching operation, by using the original stretched screen as a master for the formation of stamping dies, according to well-known techniques, such as those currently used in the reproduction of photograph records.

Another method of accomplishing a change in relation between the screen and the record area of the film is to induce an artificial shrinkage of the film. This may be done by subjecting the film to heating, to drive away some of the plasticizer therein. By experimentation with conventional cellulose acetate film, it has been found that exposure for one minute under a No. 2 photo-flood lamp and reflector 12–14" from the negative, accomplishes sufficient shrinkage to compensate for the difference between the normal viewing distance of 14" and a focusing distance of 3¾", which is a typical focusing distance for portable cameras of the reflex type. Any embrittling of the film as a consequence of its loss of plasticizer is not prohibitive, for the reason that the film, in the case of a photographic transparency, may subsequently be bonded to the lenticulated screen, with resulting support and protection of the film. Where a contact print is later made of the negative, the negative is not subjected to the rigors of repeated handling.

It will thus be seen that there have been provided methods of and means for accomplishing the aforementioned and other desirable objects.

What is claimed is:

1. In the making of parallax panoramagrams of the type wherein a photographic record is made by exposing a photosensitive film through a lens of a certain focal length with a photographing screen of laterally spaced optical elements in front of said film, and a positive photograph is made from said photographic record, the method of adapting such a parallax panoramagram for viewing at an optimum distance greater than said focal length which comprises mounting said photograph behind a screen having optical elements of greater lateral spacing than the elements of said photographing screen.

2. In the making of parallax panoramagrams of the type wherein a photographic record is made by exposing a photosensitive film through a lens of a certain focal length with a photographing screen of laterally spaced optical elements in front of said film, and a positive photograph is made from said photographic record, the method of adapting such a parallax panoramagram for viewing at an optimum distance greater than said focal length which comprises stretching a viewing screen of optical elements of the same lateral spacing as the optical elements of said photographing screen to increase said lateral spacing substantially uniformly, fixing said viewing screen at its stretched dimensions, and mounting said photograph for viewing through the stretched screen.

3. The method as claimed in claim 2 wherein said screen is fixed at its stretched dimensions by bonding it to a sheet of transparent material.

4. The method as claimed in claim 2 wherein said screen is fixed at its stretched dimensions by slightly plasticizing said screen.

5. In the making of parallax panoramagrams of the type wherein a photographic record is made by exposing a photosensitive film through a lens of a certain focal length with a photographing screen of laterally spaced optical elements in front of said film, and a positive photograph is made from said photographic record, the method of adapting such a parallax panoramagram for viewing at a distance greater than said focal length without reducing the apparent depth thereof which comprises mounting said photograph for viewing through a screen of optical elements at greater effective spacing therefrom than the effective spacing of said photographing screen from said film at the time said photographic record was made.

6. In the making of parallax panoramagrams of the type wherein a photographic record is made by exposing a photosensitive film through a lens of a certain focal length with a photographing screen of uniformly laterally spaced, vertically oriented, cylindriform lenticulations of a certain focal length, and a positive photograph is made from said photographic record, the method of adapting such a parallax panoramagram for viewing at a distance greater than said focal length without reducing the apparent depth thereof which comprises mounting said photograph for viewing through a viewing screen having similar lenticulations of a longer focal length than those of said photographing screen.

7. In the making of parallax panoramagrams of the type wherein a photographic record is made by exposing a photosensitive film through a photographing screen of laterally spaced optical elements and a positive photograph is made from said photographic record, the method of increasing the apparent depth of such a parallax panoramagram without reducing the optimum viewing distance thereof which comprises mounting said photograph for viewing through a viewing screen of optical elements having lesser lateral spacing than the optical elements of said photographing screen, with the optical elements of said viewing screen spaced a greater effective distance from said photograph than the optical elements of said photographing screen were spaced from said photosensitive film at the time said photographic record was made.

8. In the making of parallax panoramagrams of the type wherein a photographic record is made by exposing a photosensitive film through a photographing screen of uniformly laterally spaced, parallel, vertically oriented, cylindriform lenticulations of a certain focal length, and a positive photograph is made from said photographic record, the method of increasing the apparent depth of such a parallax panoramagram without reducing the optimum viewing distance thereof which comprises mounting said photograph for viewing through a viewing screen having similar lenticulations which are more closely spaced and have a longer focal length than those of said photographing screen.

References Cited in the file of this patent

UNITED STATES PATENTS

| Number | Name | Date |
| --- | --- | --- |
| 1,882,424 | Ives | Oct. 11, 1932 |
| 1,905,469 | Ives | Apr. 25, 1933 |
| 1,905,716 | Ives | Apr. 25, 1933 |
| 1,916,320 | Ives | July 4, 1933 |
| 1,935,471 | Kanolt | Nov. 14, 1933 |
| 2,002,090 | Ives | May 21, 1935 |
| 2,008,989 | Miller | July 23, 1935 |
| 2,016,270 | Arni | Oct. 8, 1935 |
| 2,045,129 | Farrand | June 23, 1936 |
| 2,150,932 | McDonnell | Mar. 21, 1939 |
| 2,151,301 | Percy | Mar. 21, 1939 |
| 2,177,539 | Spielvogel | Oct. 24, 1939 |
| 2,211,185 | Wahl | Aug. 13, 1940 |
| 2,307,276 | Keyzer | Jan. 5, 1943 |
| 2,313,947 | Klinkum | Mar. 16, 1943 |
| 2,397,010 | Jacobson | Mar. 19, 1946 |
| 2,431,217 | Waldorf | Nov. 18, 1947 |
| 2,506,131 | Bonnet | May 2, 1950 |

FOREIGN PATENTS

| Number | Country | Date |
| --- | --- | --- |
| 580,351 | France | Aug. 28, 1924 |